(12) United States Patent
Hsu et al.

(10) Patent No.: US 12,041,515 B2
(45) Date of Patent: *Jul. 16, 2024

(54) SYSTEMS AND METHODS FOR UTILIZING MODELS TO IDENTIFY LOCATION SPOOFING BY USER EQUIPMENT

(71) Applicant: Verizon Patent and Licensing Inc., Basking Ridge, NJ (US)

(72) Inventors: Sean Hsu, San Francisco, CA (US); Kurt Allen McIntyre, The Colony, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,472

(22) Filed: Jul. 14, 2023

(65) Prior Publication Data

US 2023/0362593 A1   Nov. 9, 2023

Related U.S. Application Data

(63) Continuation of application No. 17/224,684, filed on Apr. 7, 2021, now Pat. No. 11,743,688.

(51) Int. Cl.
*H04W 4/029* (2018.01)
*G06N 20/00* (2019.01)
*H04W 12/104* (2021.01)
*H04W 12/122* (2021.01)
*H04W 64/00* (2009.01)

(52) U.S. Cl.
CPC ............ *H04W 4/029* (2018.02); *G06N 20/00* (2019.01); *H04W 12/104* (2021.01); *H04W 12/122* (2021.01); *H04W 64/00* (2013.01)

(58) Field of Classification Search
None
See application file for complete search history.

(56) References Cited

U.S. PATENT DOCUMENTS

| 11,398,990 B1 * | 7/2022 | Cabrera | H04L 43/0817 |
| 2017/0070971 A1 * | 3/2017 | Wietfeldt | H04W 24/10 |

* cited by examiner

Primary Examiner — Adolf Dsouza

(57) ABSTRACT

A device may receive user equipment (UE) location data identifying a latitude and a longitude of a UE, as reported by the UE, and may receive network location data identifying a latitude and a longitude of the UE, as reported by a core network. The device may process the UE location data and the network location data to determine a confidence score associated with an actual location of the UE. The device may process the UE location data and the network location data, when the confidence score is outside a confidence interval, to determine whether the UE location data is valid. The device may perform one or more actions based on determining whether the UE location data is valid.

20 Claims, 10 Drawing Sheets

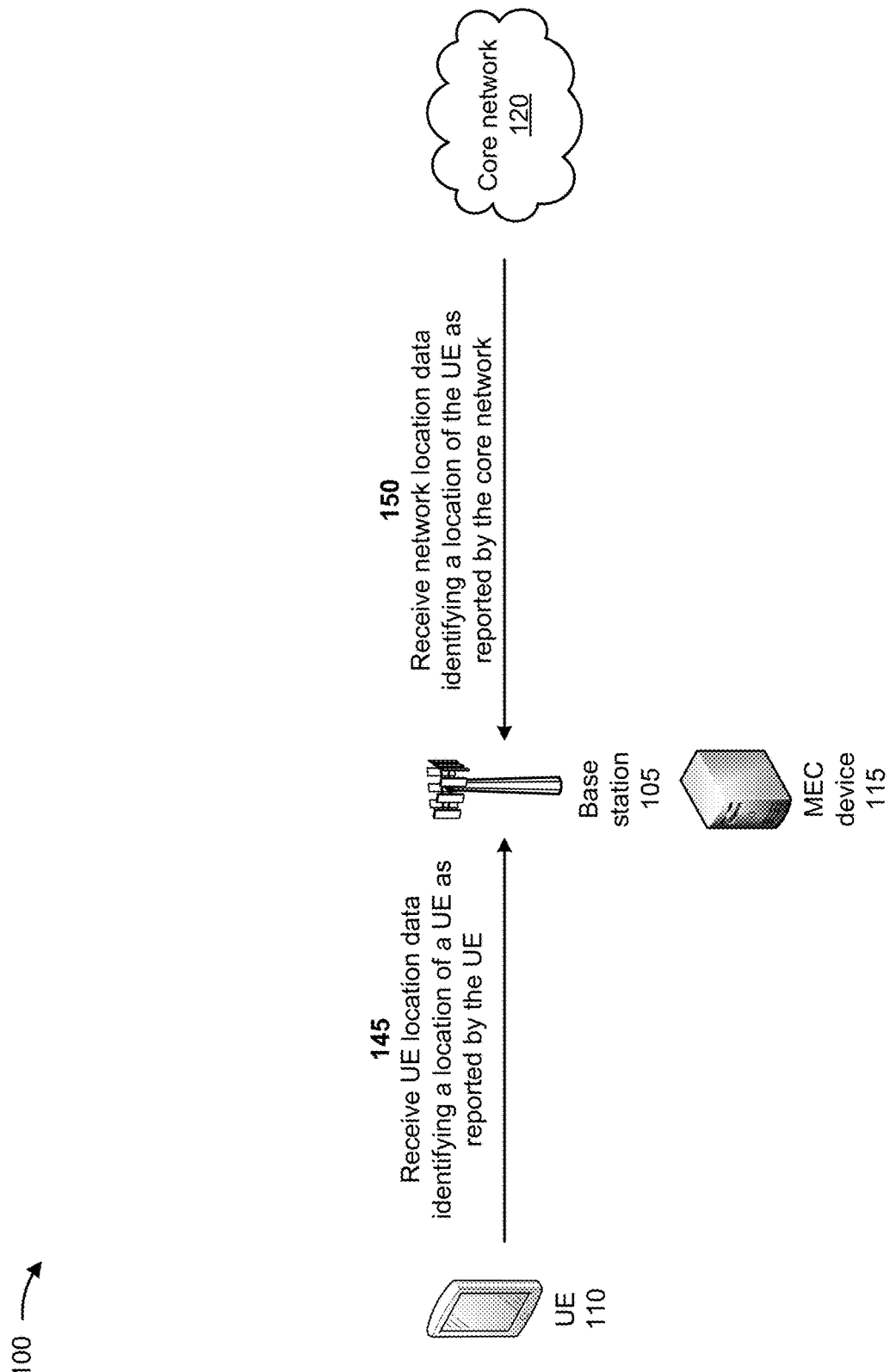

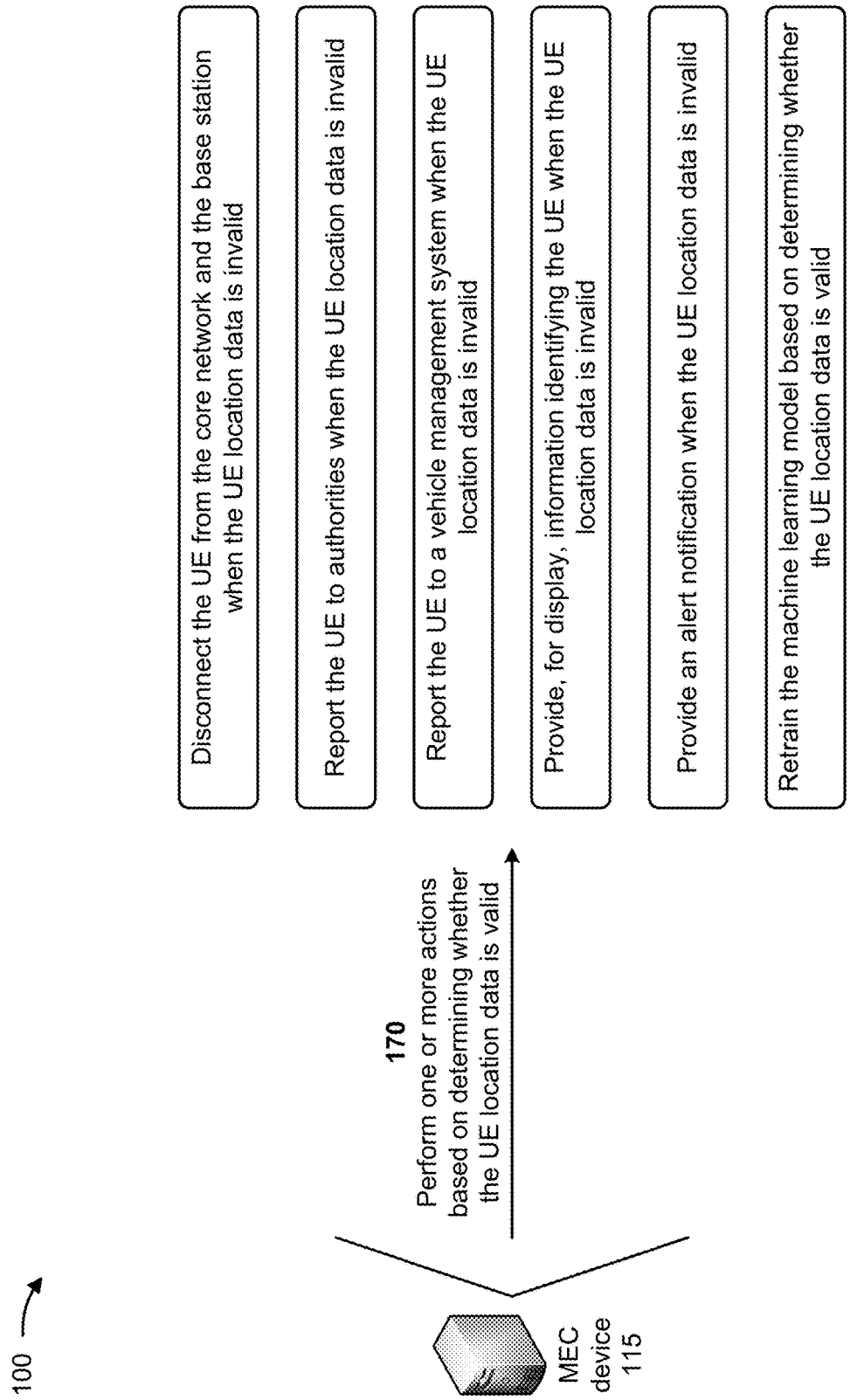

SYSTEMS AND METHODS FOR UTILIZING MODELS TO IDENTIFY LOCATION SPOOFING BY USER EQUIPMENT

RELATED APPLICATION

This application is a continuation of U.S. patent application Ser. No. 17/224,684, titled "SYSTEMS AND METHODS FOR UTILIZING MODELS TO IDENTIFY LOCATION SPOOFING BY USER EQUIPMENT," filed Apr. 7, 2021, which is incorporated herein by reference in its entirety.

BACKGROUND

Multi-access edge computing (MEC) is a technology that provides computing resources at an edge of a network (e.g., near a base station of the network). An MEC device may support computing requirements of user equipment (UEs) and/or a base station that are within an area of service of the MEC device.

BRIEF DESCRIPTION OF THE DRAWINGS

FIGS. 1A-1F are diagrams of an example associated with utilizing models to identify location spoofing by a UE.

DETAILED DESCRIPTION OF PREFERRED EMBODIMENTS

Figure 1A:
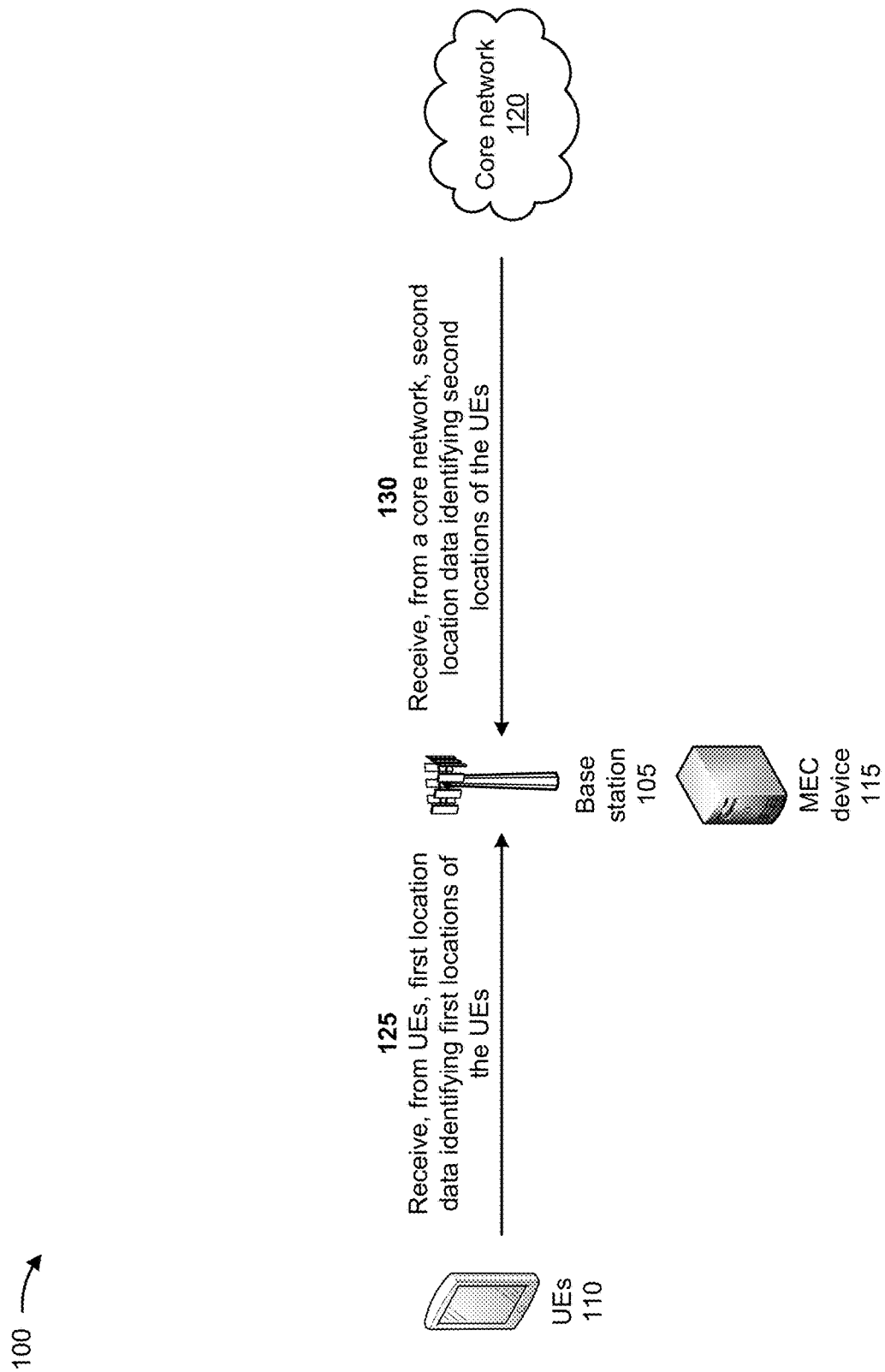

The following detailed description of example implementations refers to the accompanying drawings. The same reference numbers in different drawings may identify the same or similar elements.

Some services require receipt of accurate location data from UEs over a network. However, a UE that spoofs the location data (e.g., changes location data associated with a communication from a current location of the UE to another location at which the UE is not located) may create issues for such services. For example, vehicle-to-everything communications require accurate location data from all connected vehicles for safety purposes and to prevent chaos on the roads. A fleet management system may require accurate location data of a vehicle fleet to track and manage deliveries. Inaccurate location data or spoofing may cause operational issues for the fleet management system. Navigation software crowdsources location data from UEs to determine traffic conditions. Location data spoofing by the UEs may induce fake traffic jams by the navigation software.

Unfortunately, there are many ways for an attacker to spoof location data. For example, an attacker may spoof location data sent by a UE to web services when the UE sends the location data over an insecure channel or when credentials of the UE are compromised. An attacker may compromise and cause a UE to fake location data provided to a mobile application. An attacker may spoof location data by sending to a UE false timing and coordinates, since a global navigation satellite system (GNSS) of the UE uses an insecure protocol and provides no integrity checks. Current techniques to mitigate location data spoofing utilize corrections that occur at a client device (e.g., at a UE). However, location data spoofing may still occur in transit (e.g., between the UE and a service).

Some implementations described herein provide a device (e.g., an MEC device and/or a base station) that utilizes models to identify location spoofing by a UE. For example, the device may receive, from a plurality of UEs, first location data identifying respective first latitudes and respective first longitudes of the plurality of UEs and may receive, from a core network, second location data identifying respective second latitudes and respective second longitudes of the plurality of UEs. The device may process the first location data and the second location data, with a statistical model, to determine a confidence interval associated with actual locations of the plurality of user equipments and may train a machine learning model, with the first location data and the second location data, to generate a trained machine learning model. The device may receive UE location data identifying a latitude and a longitude of a UE, as reported by the UE, and may receive network location data identifying a latitude and a longitude of the UE, as reported by the core network. The device may process the UE location data and the network location data, for example with the statistical model, to determine a confidence score associated with an actual location of the UE and may determine whether the confidence score is within the confidence interval. The device may determine whether the UE location data is valid based on whether the confidence score is within the confidence interval and may perform one or more actions based on determining whether the UE location data is valid.

In this way, the device may utilize models to identify location spoofing by a UE. The device may identify location spoofing occurring on a client device (e.g., a UE) and location spoofing occurring in transit (e.g., between a UE and a network device). Location spoofing may occur in transit as a result of a network-based attack, such as, for example, a man-in-the-middle attack. For example, the device may process location data received by a base station associated with a UE and location data provided by the UE, with a statistical model, to determine whether the UE is spoofing the location data. If the device cannot determine with the statistical model whether the UE is spoofing the location data, the device may utilize a machine learning model to determine whether the UE is spoofing the location data. This may enable the device to determine whether the location data provided by the UE is valid or invalid. Thus, the device may conserve computing resources, networking resources, and other resources that would have otherwise been consumed by attempting to locate UEs, handling traffic accidents on the roads caused by spoofed location data, handling operational issues for fleet management systems caused by spoofed location data, handling customer complaints associated with navigation software caused by spoofed location data, and/or the like.

FIGS. 1A-1F are diagrams of an example 100 associated with utilizing models to identify location spoofing by a UE. As shown in FIGS. 1A-1F, example 100 includes a base station 105 associated with a UE 110, an MEC device 115, and a core network 120. Further details of base station 105, UE 110, MEC device 115, and core network 120 are provided below. Although certain operations are shown in FIGS. 1A-1F as being performed by MEC device 115, in some implementations, the operations may be performed by base station 105 and MEC device 115 together, by base station 105 alone, and/or the like.

As shown in FIG. 1A, and by reference number 125, the base station 105 and/or the MEC device 115 receives, from a plurality of UEs 110, first location data identifying first locations of the UEs 110. For example, a UE 110 may include a sensor device for determining a location of the UE 110, such as a global positioning system (GPS) device. The sensor device may obtain location information (e.g., a latitude and a longitude) indicating a current location of the UE 110, direction information indicating a heading or direction in which the UE 110 is traveling, speed information indicating a current speed of the UE 110, time information indicating a time of day and/or a day of the week associated with the location information, and/or the like. The UE 110 may provide the location information, the direction information, the speed information, and/or the time information to the base station 105 and/or the MEC device 115.

For example, the UE 110 may provide the location information, the direction information, the speed information, and/or the time information to the base station 105 and/or the MEC device 115 periodically (e.g., every thirty seconds, every minute, every two minutes, and/or the like), based on an occurrence of an event (e.g., based on connecting to the core network 120, based on a change in a location of the UE 110 satisfying one or more criteria, and/or the like), based on receiving a request from the base station 105 and/or the MEC device 115, and/or the like. The first location data may include the location information, the direction information, the speed information, and/or the time information provided by the UE 110, and/or location information, direction information, speed information, and/or time information provided by one or more other UEs.

Alternatively, and/or additionally, the base station 105 and/or the MEC device 115 may obtain the first location data from another device. For example, the UEs 110 may provide the location information, the direction information, the speed information, and/or the time information to a server device. The server device may store the received information in a data structure (e.g., a database, a table, a list, and/or the like). The server device may provide first location data corresponding to the information stored in the data structure to the base station 105 and/or the MEC device 115 based on receiving a request for the first location information from the base station 105 and/or the MEC device 115.

As shown by reference number 130, the base station 105 and/or the MEC device 115 receives, from the core network 120, second location data identifying second locations of the UEs 110. For example, the second location data may include information identifying latitudes and longitudes of the UEs 110 and the base station 105 and/or the MEC device 115 may receive the second location data periodically, based on providing a request for the second location data to the core network 120 (e.g., a service capability exposure function (SCEF) of the core network 120), and/or the like. In some implementations, the second location data is determined based on a base station 105 to which a UE 110 is connected, a network location capability (e.g., a timing advance and sounding reference signal and/or a cellular-received signal strength indicator, among other examples), and/or the like.

Figure 1B:
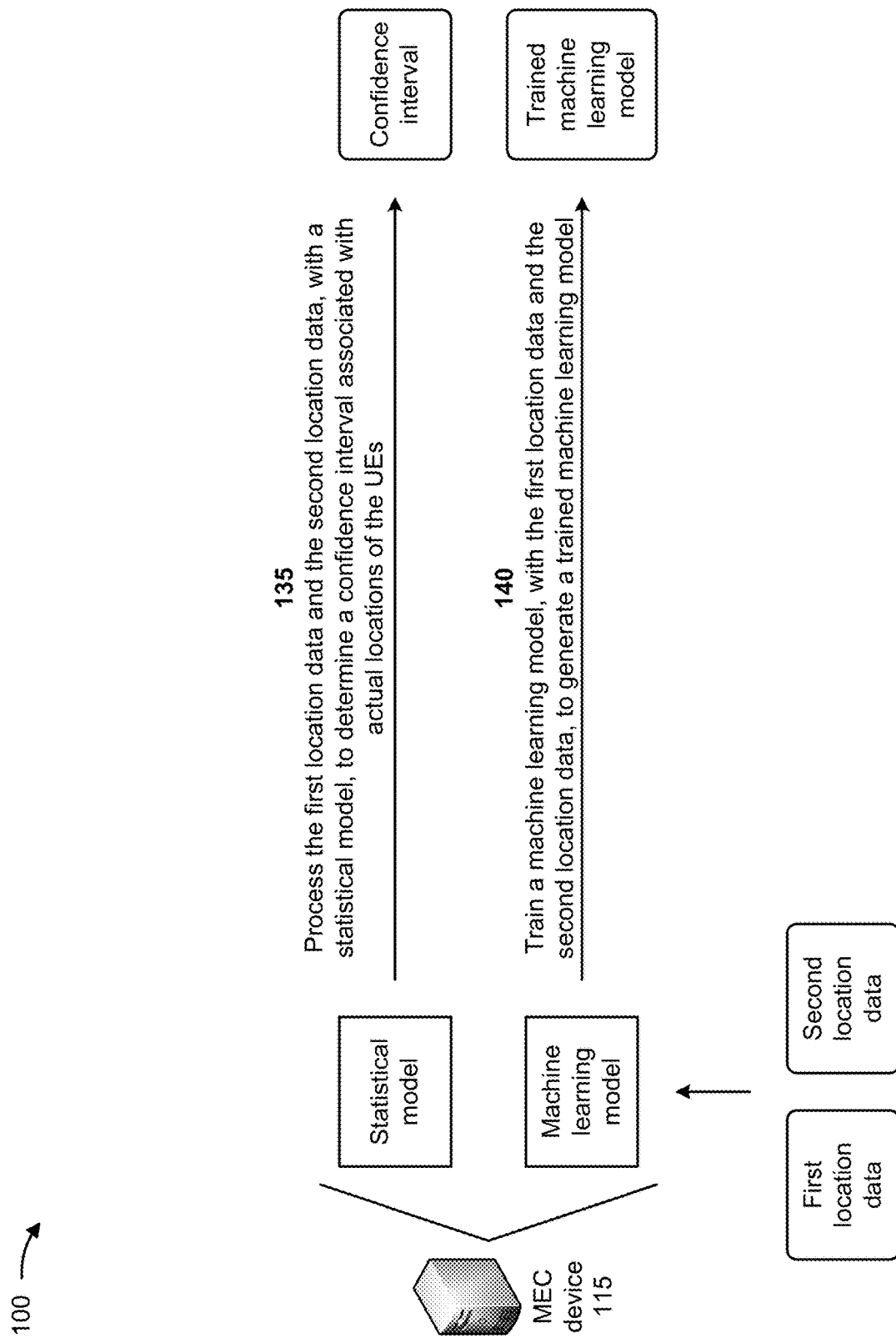

As shown in FIG. 1B, and by reference number 135, the MEC device 115 processes the first location data and the second location data, with a statistical model, to determine a confidence interval associated with actual locations of the UEs 110. The MEC device 115 may identify a position pair of location data. The position pair of location data may include location data associated with a UE 110 that is included in the first location data and corresponding location data associated with the UE 110 that is included in the second location data.

As an example, the first location data may include first location information associated with a UE 110. The first location information may include a first latitude and a first longitude for the UE 110 at a particular time. The second location data may include second location information associated with the UE 110. The second location information may include a second latitude and a second longitude for the UE 110 within a threshold time difference of the particular time. A position pair of location data for the UE 110 may include a first position corresponding to the first latitude and the first longitude and a second position corresponding to the second latitude and the second longitude.

The confidence interval may indicate a maximum difference between a position pair of location data for which location information reported by a UE 110 is determined to be valid location data (rather than invalid location data, such as spoofed location data). In some implementations, the confidence interval is defined as a distance between location information (e.g., a latitude and a longitude) that is provided by a UE 110 and location information associated with the UE 110 that is provided by the core network 120.

The MEC device 115 may apply a central limit theorem model, to position pairs of location data included in the first location data and the second location data, to calculate an arithmetic mean of the confidence intervals associated with the position pairs of location data. For example, the MEC device 115 may determine a distance between a first position and a second position of each position pair of location data. The MEC device 115 may calculate a sum of the determined distances. The MEC device 115 may calculate the arithmetic mean based on dividing the sum of the determined distances by a quantity of the position pairs.

The MEC device 115 may generate a normal distribution based on the arithmetic mean. The normal distribution may approximate a probability distribution of the arithmetic mean. The MEC device 115 may determine the confidence interval based on the normal distribution. For example, the MEC device 115 may determine that a percentage (e.g., 75%, 80%, 90%, and/or the like) of distances between the position pairs of location data are less than a particular distance based on the normal distribution. The MEC device 115 may determine the confidence interval based on the particular distance (e.g., valid location data reported by a UE 110 within the particular distance from location data for the UE 110 reported by the core network 120).

Alternatively, and/or additionally, the confidence interval may be determined by another device. For example, the MEC device 115 may provide the first location data and/or the second location data to a server device included in a cloud computing environment, a network device included in the core network 120, another MEC device, and/or the like. The other device may receive the first location data and/or the second location data and may determine the confidence interval in a manner similar to that described above. The other device may provide information identifying the confidence interval to the MEC device 115.

As shown by reference number 140, the MEC device 115 trains a machine learning model, with the first location data and the second location data, to generate a trained machine learning model. Alternatively, the MEC may rely on a machine learning model that is not trained at the MEC. The machine learning model may include a classification machine learning model, a logistic regression machine learning model, a decision tree machine learning model, a support vector machine learning model, a neural network, and/or the like. In some implementations, in addition to the first location data and the second location data, the MEC device 115 trains the machine learning model with direction information, speed information, time information, and/or information associated with a base station 105 (e.g., a cell identifier, a location of the base station 105, a transmission band associated with the base station 105, and/or the like) to which a UE 110 is connected that is included in the first location data and/or the second location data.

The MEC device 115 may train the machine learning model to receive location data provided by a UE and location data for the UE provided by a core network as inputs and to generate an output indicating whether the location data provided by a UE is valid (e.g., whether the location data provided by the UE corresponds to an actual location of the UE) and a score that reflects a measure of confidence that the indication of whether the location data provided by the UE is valid is accurate. In some implementations, the MEC device 115 trains the machine learning model in a manner similar to that described below with respect to FIG. 2.

As shown in FIG. 1C, and by reference number 145, the base station 105 and/or the MEC device 115 receives UE location data identifying a location of a UE 110 as reported by the UE 110. For example, the base station 105 and/or the MEC device 115 may receive UE location information identifying a latitude and a longitude of the UE 110, as reported by the UE 110.

As shown by reference number 150, the base station 105 and/or the MEC device 115 receives network location data identifying a location of the UE 110 as reported by the core network 120. For example, the base station 105 and/or the UE 110 may receive network location data identifying a latitude and a longitude of the UE 110, as reported and/or determined by the core network 120.

Figure 1D:
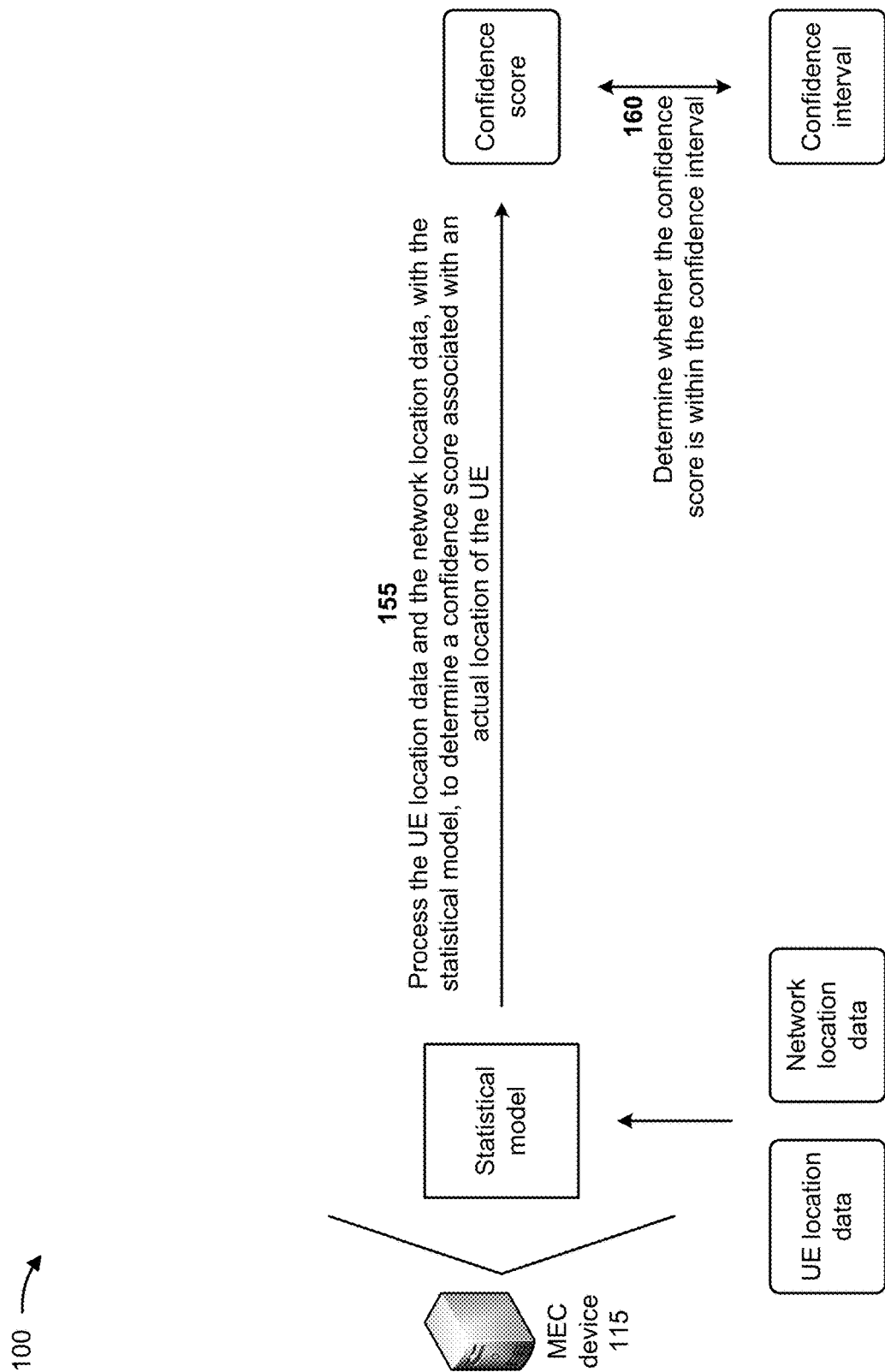

As shown in FIG. 1D, and by reference number 155, the MEC device 115 processes the UE location data and the network location data, with the statistical model, to determine a confidence score associated with an actual location of the UE 110. In some implementations, the confidence score is determined based on a distance between a first location corresponding to the UE location data and a second location corresponding to the network location data. For example, the UE location data may include a first latitude and a first longitude. The network location data may include a second latitude and a second longitude. The MEC device 115 may determine a distance between a first location corresponding to the first latitude and the first longitude and a second location corresponding to the second latitude and the second longitude. The MEC device 115 may determine the confidence score based on the distance between the first location and the second location.

In some implementations, the confidence score corresponds to the distance between the first location and the second location. For example, the confidence score may be a value of 45 based on the distance between the first location and the second location being 45 meters.

In some implementations, the confidence score may be determined based on a plurality of ranges of distances. For example, the confidence score may be a first value when the distance between the first location and the second location is within a first range of distances (e.g., less than 50 meters, between 0 meters to 50 meters). In some implementations, the first range of distances corresponds to the confidence interval. The confidence score may be a second value when the distance between the first location and the second location is within a second range of distances (e.g., greater than 50 meters, 50 meters to 100 meters, and/or the like).

As shown by reference number 160, the MEC device 115 determines whether the confidence score is within the confidence interval. The MEC device 115 may compare the confidence score and the confidence interval and may determine whether the confidence score is within the confidence interval based on the comparison.

In some implementations, the confidence score corresponds to the distance between the first location and the second location, described above. In some implementations, the confidence interval includes a maximum distance (e.g., 50 meters, 100 meters, and/or the like) and the base station 105 determines that the confidence score is within the confidence interval when the distance between the first location and the second location is less than the maximum distance. Alternatively, and/or additionally, the confidence interval may include a range of distances and the base station 105 may determine that the confidence score is within the confidence interval when the distance between the first location and the second location is within the range of distances.

In some implementations, the confidence score is the first value or the second value, described above. The MEC device 115 may determine that the confidence score is within the confidence interval when the confidence score comprises the first value.

The MEC device 115 may determine that the UE location data is valid when the confidence score is within the confidence interval. The MEC device 115 may determine that the UE location data is invalid when the confidence score is not within the confidence interval. Alternatively, and/or additionally, the MEC device 115 may determine to process the UE location data and the network location data with the trained machine learning model, as described below, when the confidence score is not within the confidence interval.

Figure 1E:
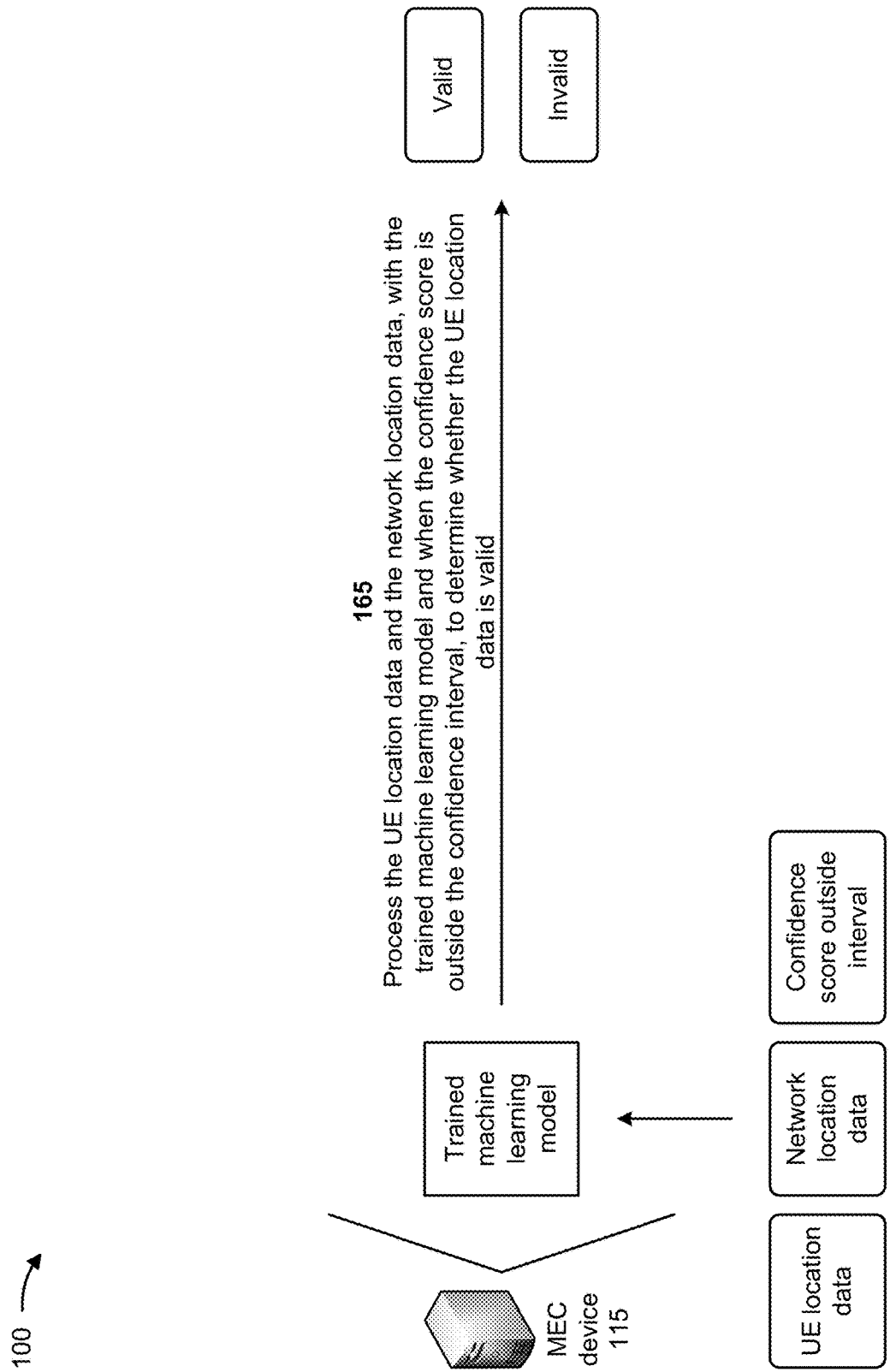

As shown in FIG. 1E, and by reference number 165, the MEC device 115 processes the UE location data and the network location data, with the trained machine learning model and when the confidence score is outside the confidence interval, to determine whether the UE location data is valid. The machine learning model may receive the UE location data and the network location data as an input and may generate an output indicating whether the UE location data is valid.

Alternatively, and/or additionally, the MEC device 115 may process the UE location data and the network location data with the trained machine learning model when the confidence score is inconclusive as to whether the UE location data is valid. As an example, the confidence interval may include a range of distances defined by a minimum distance (e.g., 0 meters) and a maximum distance (e.g., 100 meters) and the confidence score may correspond to a distance between the first location and the second location, described above. The confidence score may be inconclusive as to whether the UE location data is valid when the confidence score (e.g., the distance between the first location and the second location) is within a predetermined distance (e.g., 1 meter, 5 meters, 10 meters, and/or the like) of the maximum distance.

In some implementations, the MEC device 115 processes the UE location data and the network location data, with the trained machine learning model, to determine whether the UE location data is valid when the confidence score is within the confidence interval. The MEC device 115 may compare the confidence score with an output of the machine learning model and may determine whether the UE location data is valid based on the comparison. For example, the MEC device 115 may determine that the UE location data is valid based on the confidence score being within the confidence interval and the output of the machine learning model indicating that the UE location data is valid.

In some implementations, the MEC device 115 stores information indicating whether the UE location data is valid, information identifying the UE 110, the confidence score, and/or the like in a data structure. The MEC device 115 may monitor a quantity of times that UE location data reported by the UE 110 is determined to be invalid based on the information stored in the data structure. In some implementations, the MEC device 115 performs one or more actions (e.g., the one or more actions described below with respect to FIG. 1F) based on the quantity of times that UE location data reported by the UE 110 is determined to be invalid satisfying one or more criteria (e.g., satisfying a quantity threshold).

As shown in FIG. 1F, and by reference number 170, the MEC device 115 performs one or more actions based on determining whether the UE location data is valid. In some implementations, the one or more actions include the MEC device 115 disconnecting the UE 110 from the core network 120 and the base station 105. For example, the MEC device 115 may disconnect the UE 110 from the core network 120 and the base station 105 when the UE location data is invalid.

In some implementations, the one or more actions include the MEC device 115 reporting the UE 110 to authorities. For example, the MEC device 115 may provide information identifying the UE 110, information identifying a location of the UE 110, information identifying a user associated with the UE 110, and/or the like to a device associated with a law enforcement agency when the UE location data is invalid.

In some implementations, the one or more actions include the MEC device 115 reporting the UE 110 to a vehicle management system when the UE location data is invalid. For example, the UE 110 may be associated with a fleet management service that requires an employee to periodically provide location information via the UE 110. The fleet management service may register a device identifier associated with a vehicle management system, information identifying the UE 110, information identifying a frequency at which the UE 110 provides UE location data, and/or the like with a service provider associated with the MEC device 115 and/or the core network 120. The core network 120 may provide network location data associated with the UE 110 to the MEC device 115 based on the fleet management service registering the device identifier, the information identifying a frequency at which the UE 110 provides UE location data, and/or the like with the service provider.

In some implementations, the core network 120 synchronizes providing the network location data with the UE 110 providing the UE location data. For example, a SCEF of the core network 120 may be configured to provide the network location data at a frequency at which the UE 110 provides the UE location data to the MEC device 115. The MEC device 115 may subscribe to receive the UE location data from the SCEF based on the UE 110 connecting to a base station 105 associated with the MEC device 115 and/or based on receiving the UE location data. The SCEF may provide the network location data at the frequency at which the UE 110 provides the UE location data to the MEC device 115 based on the SCEF being configured to provide the network location data at the frequency at which the UE 110 provide the UE location data and/or based on the MEC device 115 subscribing to receive the UE location data. The MEC device 115 may utilize the device identifier associated with the vehicle management system to report the UE 110 to the vehicle management system when the UE location data is invalid based on the fleet management service registering with the service provider.

In some implementations, the one or more actions include the MEC device 115 providing, for display, information identifying the UE 110 and/or providing an alert notification when the UE location data is invalid. For example, the base station 105 may cause an alert notification to be generated and/or information identifying the UE 110 to be displayed by the UE 110, a device associated with a fleet management system, a device associated with a law enforcement agency, and/or the like when the UE location data is invalid.

In some implementations, the one or more actions include the MEC device 115 retraining the machine learning model based on determining whether the UE location data is valid. The base station 105 may utilize the UE location data, the network location data, and/or the confidence score as additional training data for retraining the machine learning model, thereby increasing the quantity of training data available for training the machine learning model. Accordingly, the MEC device 115 may conserve computing resources (e.g., processing resources, memory resources, communication resources, and/or the like) associated with identifying, obtaining, and/or generating historical data for training the machine learning model relative to other systems for identifying, obtaining, and/or generating historical data for training machine learning models.

As described above, the MEC device 115 may utilize models to determine whether UE location data is valid (e.g., to identify location spoofing by a UE). The MEC device 115 may identify location spoofing occurring on a client device (e.g., UE 110) and location spoofing occurring in transit (e.g., between the UE 110 and the base station 105 or the MEC device 115). Location spoofing may occur in transit as a result of a network-based attack, such as, for example, a man-in-the-middle attack. For example, MEC device 115 may process location data received by base station 105 associated with UE 110 and location data provided by UE 110, with a statistical model, to determine whether UE 110 is spoofing the location data. If MEC device 115 cannot determine whether UE 110 is spoofing the location data with the statistical model, MEC device 115 may utilize a machine learning model to determine whether UE 110 is spoofing the location data. This may enable MEC device 115 to determine whether the location data provided by UE 110 is valid or invalid. Thus, MEC device 115 may conserve computing resources, networking resources, and other resources that would have otherwise been consumed by attempting to locate UEs 110, handling traffic accidents on the roads caused by spoofed location data, handling operational issues for fleet management systems caused by spoofed location data, handling customer complaints associated with navigation software caused by spoofed location data, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

Figure 2:
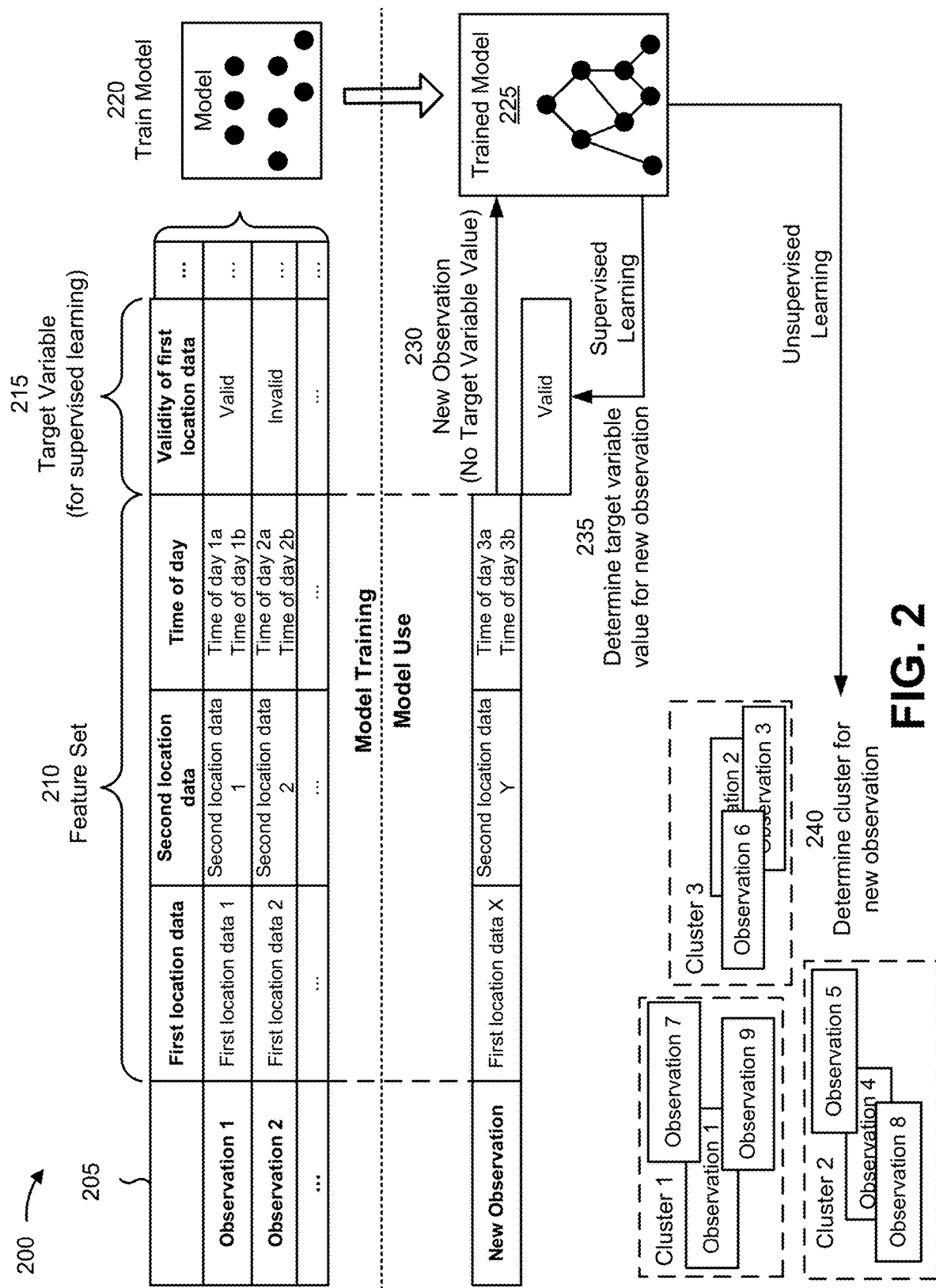
FIG. 2 is a diagram illustrating an example of training and using a machine learning model in connection with identifying location spoofing by a UE.

FIG. 2 is a diagram illustrating an example 200 of training and using a machine learning model in connection with identifying location spoofing by UE 110. The machine learning model training and usage described herein may be performed using a machine learning system. The machine learning system may include or may be included in a computing device, a server, a cloud computing environment, and/or the like, such as MEC device 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from MEC device 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from MEC device 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of first location data, a second feature of second location data, a third feature of time of day (e.g., a time at which the first location data was determined and a time at which the second location data was determined), and so on. As shown, for a first observation, the first feature may have a value of first location data 1, the second feature may have a value of second location data 1, the third feature may have a value of time of day 1a (e.g., a time at which the first location data was determined) and time of day 1b (e.g., a time at which the second location data was determined), and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a validity of first location data, which has a value of valid for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first location data X, a second feature of second location data Y, a third feature of time of day 3a and time of day 3b, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of valid for the target variable of the validity of first location data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first location data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second location data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify location spoofing of location data associated with the UE 110. The machine learning system enables recognition and/or identification of tens, hundreds, thousands, or millions of features and/or feature values for tens, hundreds, thousands, or millions of observations, thereby increasing accuracy and consistency and reducing delay associated with identifying location spoofing of location data associated with the UE 110 relative to requiring computing resources to be allocated for tens, hundreds, or thousands of operators to manually identify location spoofing of location data associated with the UE 110.

As indicated above, FIG. 2 is provided as an example. Other examples may differ from what is described in connection with FIG. 2.

Figure 3:
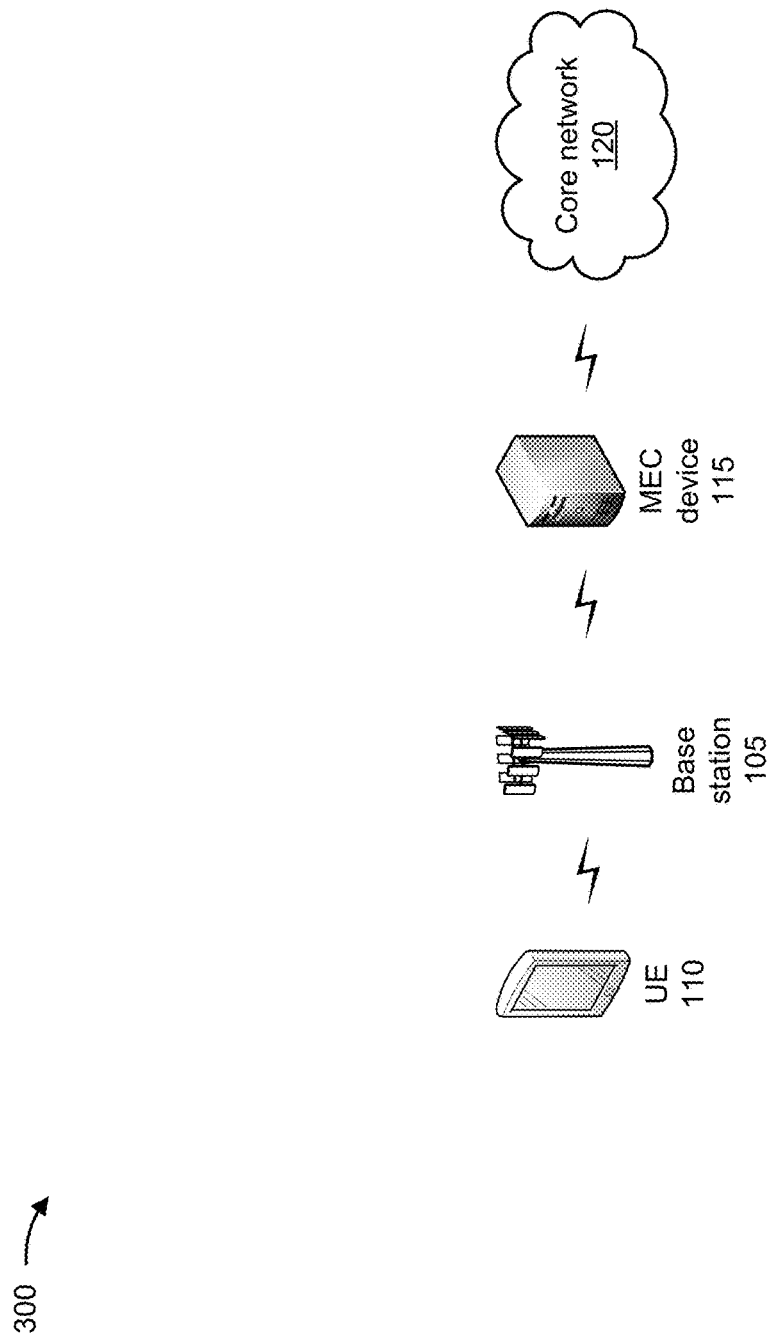
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include base station 105, UE 110, MEC device 115, and/or core network 120. Devices and/or elements of environment 300 may interconnect via wired connections and/or wireless connections.

Base station 105 includes one or more devices capable of transferring traffic, such as audio, video, text, and/or other traffic, destined for and/or received from UE 110. For example, base station 105 may include an eNodeB (eNB) associated with an LTE network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

UE 110 includes one or more devices capable of receiving, generating, storing, processing, and/or providing information, as described elsewhere herein. UE 110 may include a communication device. For example, UE 110 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

MEC device 115 includes one or more devices capable of receiving, generating, storing, processing, providing, and/or routing information, as described elsewhere herein. MEC device 115 may include a communication device and/or a computing device. For example, MEC device 115 may include a device, such as an application device, a client device, a web device, a database device, a host device, a proxy device, a virtual device (e.g., executing on computing hardware), or a device in a cloud computing system. In some implementations, MEC device 115 includes computing hardware used in a cloud computing environment.

Core network 120 may include a core network or a RAN that includes one or more base stations 105 that take the form of eNBs, gNBs, among other examples, via which a user device (e.g., a mobile phone, a laptop computer, a tablet computer, a desktop computer, among other examples) communicates with a core network. Core network 120 may include one or more wired and/or wireless networks. For example, core network 120 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, among other examples, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
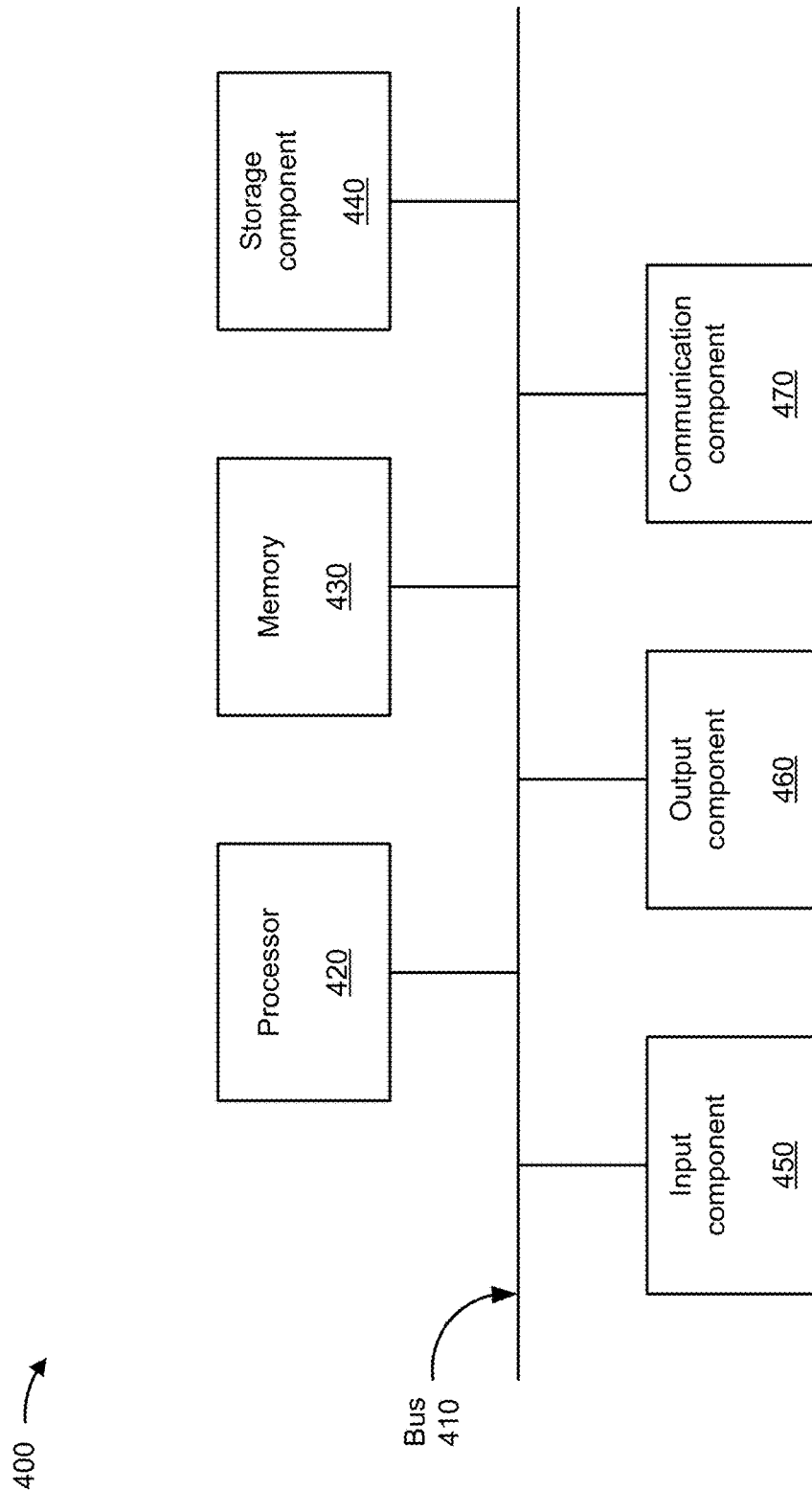
FIG. 4 is a diagram of example components of one or more devices of FIG. 3.

FIG. 4 is a diagram of example components of one or more devices of FIG. 3. The one or more devices may include a device 400, which may correspond to base station 105, UE 110, and/or MEC device 115. In some implementations, base station 105, UE 110, and/or MEC device 115 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory). The storage component 440 stores information and/or software related to the operation of device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
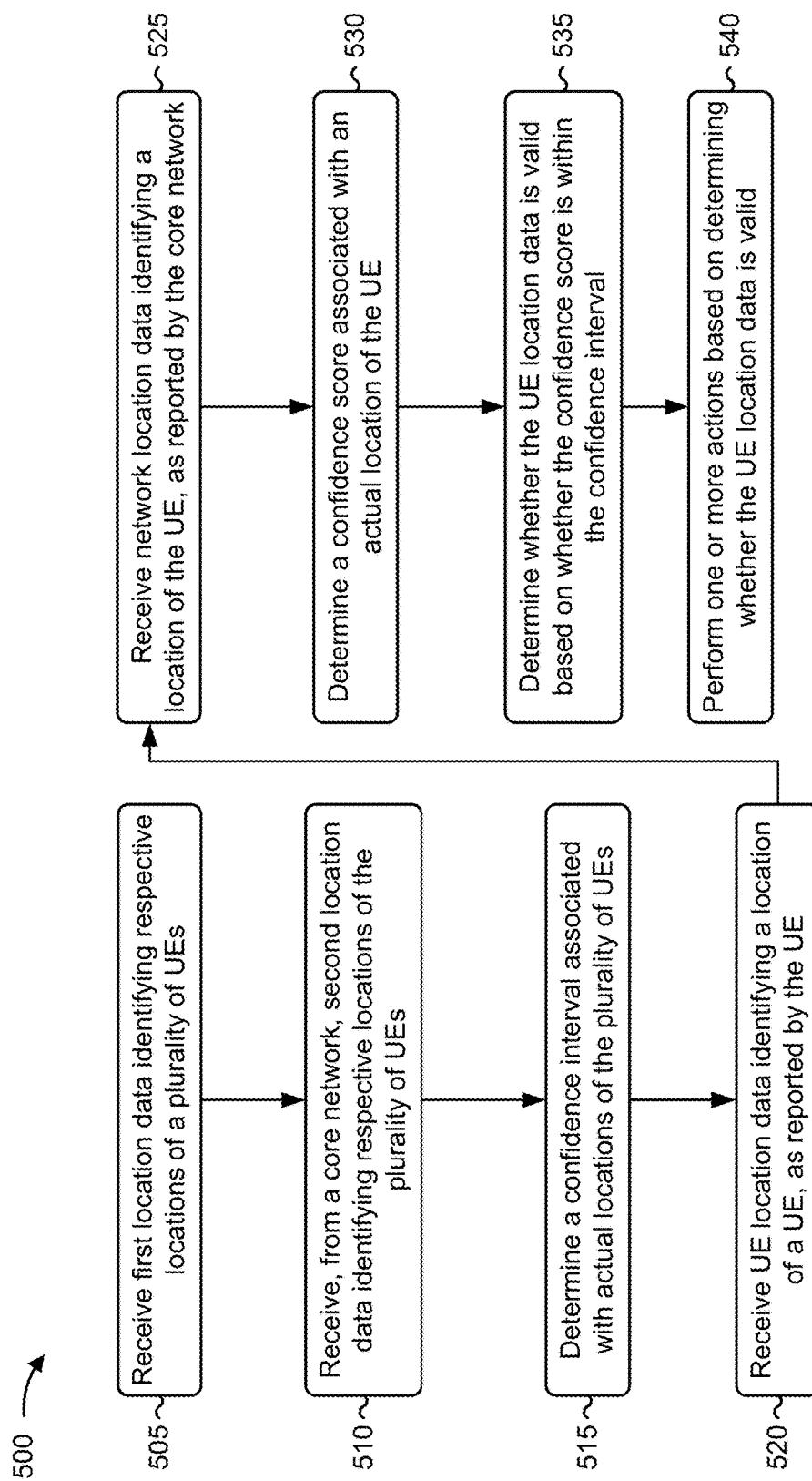
FIG. 5 is a flowchart of an example process for utilizing models to identify location spoofing by a UE.

FIG. 5 is a flowchart of an example process 500 for utilizing models to identify location spoofing by UE 110. In some implementations, one or more process blocks of FIG. 5 may be performed by a device (e.g., base station 105 and/or MEC device 115). In some implementations, one or more process blocks of FIG. 5 may be performed by another device or a group of devices separate from or including the device, such as a UE (e.g., UE 110) and/or a device of core network 120. Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving first location data identifying respective locations of a plurality of UEs (block 505). For example, the device may receive, from a plurality of UEs, first location data identifying respective first latitudes and respective first longitudes of the plurality of UEs, as described above. The device may include a base station (e.g., base station 105) and/or an MEC device (e.g., MEC device 115).

As further shown in FIG. 5, process 500 may include receiving, from a core network, second location data identifying respective locations of the plurality of UEs (block 510). For example, the device may receive, from a core network, second location data identifying respective second latitudes and respective second longitudes of the plurality of UEs, as described above.

As further shown in FIG. 5, process 500 may include determining a confidence interval associated with actual locations of the plurality of UEs (block 515). For example, the device may process the first location data and the second location data, with a statistical model, to determine a confidence interval associated with actual locations of the plurality of UEs, as described above. The device may apply a central limit theorem model, to the first location data and the second location data, to calculate an arithmetic mean and to create a normal distribution based on the arithmetic mean. The device may determine the confidence interval based on the normal distribution.

As further shown in FIG. 5, process 500 may include receiving UE location data identifying a location of a UE, as reported by the UE (block 520). For example, the device may receive UE location data identifying a latitude and a longitude of a UE, as reported by the UE, as described above.

As further shown in FIG. 5, process 500 may include receiving network location data identifying a location of the UE, as reported by the core network (block 525). For example, the device may receive network location data identifying a latitude and a longitude of the UE, as reported by the core network, as described above.

As further shown in FIG. 5, process 500 may include determining a confidence score associated with an actual location of the UE (block 530). For example, the device may process the UE location data and the network location data, with the statistical model, to determine a confidence score associated with an actual location of the UE, as described above.

As further shown in FIG. 5, process 500 may include determining whether the UE location data is valid based on whether the confidence score is within a confidence interval (block 535). For example, the device may determine that the UE location data is valid when the confidence score is within a confidence interval and may determine that the UE location data is invalid when the confidence score is not within the confidence interval, as described above.

In some implementations, the device may process the UE location data and the network location data, with a machine learning model, to determine whether the UE location data is valid based on whether the confidence score is within the confidence interval. For example, the device may train a machine learning model, with historical first location data and historical second location data, to generate a trained machine learning model, as described above. Alternatively, and/or additionally, the device may generate the trained machine learning model based on training the machine learning model with a heading of a UE, a speed of a UE, a time of day associated with the historical first location data, a time of day associated with the historical second location data, and/or a day of week associated with receipt of the first location data. The machine learning model may include a classification machine learning model, a logistic regression machine learning model, a decision tree machine learning model, and/or a support vector machine learning model.

Alternatively, and/or additionally, the device may generate a first result indicating whether the UE location data is valid based on whether the confidence score is within the confidence interval. The device may generate a second result indicating whether the UE location data is valid based on processing the UE location data and the network location data with the machine learning model. The device may determine whether the UE location data is valid based on comparing the first result and the second result.

As further shown in FIG. 5, process 500 may include performing one or more actions based on determining whether the UE location data is valid (block 540). For example, based on determining whether the UE location data is valid, the device may perform one or more actions, such as retraining the machine learning model based on determining whether the UE location data is valid, disconnecting the UE from the core network and/or the device when the UE location data is invalid, and/or reporting the UE to authorities and/or a vehicle management system associated with the UE when the UE location data is invalid. Alternatively, and/or additionally, when the UE location data is invalid the device may provide, for display, information identifying the UE and/or provide an alert notification.

In some implementations, the device may provide information indicating whether the UE location data is valid to another device (e.g., the UE, a device associated with a supervisor of an employee associated with the UE, and/or the like). The device may receive feedback associated with the information indicating whether the UE location data is valid. For example, the device may receive feedback indicating whether the information indicating whether the UE location data is valid was correctly determined. The device may modify and/or retrain the machine learning model based on the feedback. Alternatively, and/or additionally, the device may modify the confidence interval based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining, by a device, a confidence interval associated with actual locations of a user equipment (UE) based on first location data received from the UE and second location data received from a core network;
    receiving, by the device, UE location data identifying a first reported location of the UE, as reported by the UE, and network location data identifying a second reported location of the UE, as reported by the core network;
    determining, by the device and based on the UE location data and the network location data, a confidence score associated with an actual location of the UE; and
    performing, by the device, one or more actions based on determining whether the confidence score associated with the actual location of the UE is within the confidence interval.

2. The method of claim 1, further comprising:
    determining whether the UE location data is valid based on whether the confidence score is within the confidence interval.

3. The method of claim 1, further comprising:
    processing the UE location data and the network location data, with a machine learning model, to determine whether the UE location data is valid based on whether the confidence score is within the confidence interval, wherein the machine learning model is trained based on the first location data and the second location data;
    generating a first result indicating whether the UE location data is valid based on whether the confidence score is within the confidence interval;

generating a second result indicating whether the UE location data is valid based on processing the UE location data and the network location data with the machine learning model; and determining whether the UE location data is valid based on comparing the first result and the second result.

4. The method of claim 3, further comprising:
training the machine learning model, with one or more of:
the first location data,
the second location data,
a heading of the user equipment,
a speed of the UE,
a time of day associated with receipt of the first location data,
a time of day associated with receipt of the second location data,
a day of a week associated with receipt of the first location data, or
a day of a week associated with receipt of the second location data; and
determining whether the UE location data is valid based on processing the UE location data and the network location data with the trained machine learning model.

5. The method of claim 4, wherein the machine learning model includes one or more of:
a classification machine learning model,
a logistic regression machine learning model,
a decision tree machine learning model, or
a support vector machine learning model.

6. The method of claim 1, further comprising:
applying a central limit theorem model, to the first location data and the second location data, to calculate an arithmetic mean and to create a normal distribution based on the arithmetic mean; and
determining the confidence interval based on the normal distribution.

7. The method of claim 1, wherein the device includes one or more of a base station or a multi-access edge computing device.

8. A non-transitory computer-readable medium storing a set of instructions, the set of instructions comprising:
one or more instructions that, when executed by one or more processors of a device, cause the device to:
determine a confidence interval associated with actual locations of a user equipment (UE) based on first location data received from the UE and second location data received from a core network;
receive UE location data identifying a first reported location of the UE, as reported by the UE, and network location data identifying a second reported location of the UE, as reported by the core network;
determine, based on the UE location data and the network location data, a confidence score associated with an actual location of the UE; and
perform one or more actions based on determining whether the confidence score associated with the actual location of the UE is within the confidence interval.

9. The non-transitory computer-readable medium of claim 8, wherein the one or more instructions further cause the device to:
determine whether the UE location data is valid based on whether the confidence score is within the confidence interval.

10. The non-transitory computer-readable medium of claim 8, wherein the one or more instructions further cause the device to:
process the UE location data and the network location data, with a machine learning model, to determine whether the UE location data is valid based on whether the confidence score is within the confidence interval, wherein the machine learning model is trained based on the first location data and the second location data;
generate a first result indicating whether the UE location data is valid based on whether the confidence score is within the confidence interval;
generate a second result indicating whether the UE location data is valid based on processing the UE location data and the network location data with the machine learning model; and
determine whether the UE location data is valid based on comparing the first result and the second result.

11. The non-transitory computer-readable medium of claim 10, wherein the one or more instructions further cause the device to:
train the machine learning model, with one or more of:
the first location data,
the second location data,
a heading of the user equipment,
a speed of the UE,
a time of day associated with receipt of the first location data,
a time of day associated with receipt of the second location data,
a day of a week associated with receipt of the first location data, or
a day of a week associated with receipt of the second location data; and
determine whether the UE location data is valid based on processing the UE location data and the network location data with the trained machine learning model.

12. The non-transitory computer-readable medium of claim 11, wherein the machine learning model includes one or more of:
a classification machine learning model,
a logistic regression machine learning model,
a decision tree machine learning model, or
a support vector machine learning model.

13. The non-transitory computer-readable medium of claim 8, wherein the one or more instructions further cause the device to:
apply a central limit theorem model, to the first location data and the second location data, to calculate an arithmetic mean and to create a normal distribution based on the arithmetic mean; and
determine the confidence interval based on the normal distribution.

14. The non-transitory computer-readable medium of claim 8, wherein the device includes one or more of a base station or a multi-access edge computing device.

15. A device, comprising:
one or more processors configured to:
determine a confidence interval associated with actual locations of a user equipment (UE) based on first location data received from the UE and second location data received from a core network;
receive UE location data identifying a first reported location of the UE, as reported by the UE, and network location data identifying a second reported location of the UE, as reported by the core network;
determine, based on the UE location data and the network location data, a confidence score associated with an actual location of the UE; and perform one or more actions based on determining whether the confidence score associated with the actual location of the UE is within the confidence interval.

16. The device of claim 15, wherein the one or more processors are further configured to:
determine whether the UE location data is valid based on whether the confidence score is within the confidence interval.

17. The device of claim 15, wherein the one or more processors are further configured to:
process the UE location data and the network location data, with a machine learning model, to determine whether the UE location data is valid based on whether the confidence score is within the confidence interval, wherein the machine learning model is trained based on the first location data and the second location data;
generate a first result indicating whether the UE location data is valid based on whether the confidence score is within the confidence interval;
generate a second result indicating whether the UE location data is valid based on processing the UE location data and the network location data with the machine learning model; and
determine whether the UE location data is valid based on comparing the first result and the second result.

18. The device of claim 17, wherein the one or more processors are further configured to:
train the machine learning model, with one or more of:
the first location data,
the second location data,
a heading of the user equipment,
a speed of the UE,
a time of day associated with receipt of the first location data,
a time of day associated with receipt of the second location data,
a day of a week associated with receipt of the first location data, or
a day of a week associated with receipt of the second location data; and
determine whether the UE location data is valid based on processing the UE location data and the network location data with the trained machine learning model.

19. The device of claim 18, wherein the machine learning model includes one or more of:
a classification machine learning model,
a logistic regression machine learning model,
a decision tree machine learning model, or
a support vector machine learning model.

20. The device of claim 15, wherein the one or more processors are further configured to:
apply a central limit theorem model, to the first location data and the second location data, to calculate an arithmetic mean and to create a normal distribution based on the arithmetic mean; and
determine the confidence interval based on the normal distribution.

* * * * *